Patented Jan. 27, 1953

2,626,957

UNITED STATES PATENT OFFICE 2,626,957

HEXA(ALKOXY) AND HEXA(ALKYLTHIO) DISILOXANES

Bernard A. Orkin, Philadelphia, Pa., assignor to Socony-Vacuum Oil Company, Incorporated, a corporation of New York No Drawing. Application September 1, 1948, Serial No. 47,343

4 Claims. (Cl. 260—448.8)

This invention relates, broadly, to ester-type synthetic lubricants having a desirable combination of properties, namely, high viscosity indices, low pour points, and good stability. It is more particularly concerned with esters of disilicic acid and dithiosilicic acid having the aforementioned desirable combination of properties, and with a process for their production.

Esters of disilicic acid and dithiosilicic acid are organic compounds having the formula, $(RT)_3SiOSi(TR)_3$, wherein R is an aliphatic, an alicyclic, an aryl, an aralkyl, or a heterocyclic radical, and T is a divalent oxygen or sulfur atom. The preparation of compounds having the general formula, $(RT)_3SiOSi(TR)_3$, has been described by Schumb and Holloway [J. Am. Chem. Soc., 63, 2853 (1941)]; Backer and Stienstra [Rec. trav. chim., 54, 38 (1935)]; Martin and Kipping [J. Chem. Soc., 95, 302 (1909)]; and Friedel and Krafts [Ann., 136, 203 (1865); ibid., 147, 355 (1868)]. The compounds which have been described, however, have had low viscosities, which render them unsuitable as lubricants.

In accordance with the present invention, it has been discovered that it is possible to prepare esters of disilicic acid and dithiosilicic acid having a combination of all of the desirable properties mentioned hereinbefore. It has now been found that certain compounds having the formula, $(RT)_3SiOSi(TR)_3$, wherein R and T are as defined hereinbefore, and which are prepared by reacting hexachlorodisiloxane with an alcohol, phenol, or thiol constitute excellent synthetic lubricants having high viscosity indices, low pour points, and good stability.

Accordingly, it is an object of the present invention to provide synthetic lubricants which are relatively inexpensive. Another object is to provide a method for producing esters of disilicic acid and dithiosilicic acid which is simple and efficient. A more specific object is to provide ester-type synthetic lubricants having high viscosity indices, low pour points, and good stability. Other objects and advantages of the present invention will become obvious to those skilled in the art from the following detailed description.

Broadly stated, the present invention provides synthetic lubricants having high viscosity indices, low pour points, and good stability, which comprise compounds having the formula, $(RT)_3SiOSi(TR)_3$, wherein R is an aliphatic, an alicyclic, an aryl, an aralkyl, or a heterocyclic radical, and T is a divalent oxygen or sulfur atom; in which the total number of carbon atoms and heterocyclic atoms in each molecule varies between about 42 atoms and about 60 atoms; and a method for producing them, which comprises reacting hexachlorodisiloxane with a compound having the formula, RTH, wherein R is an aliphatic, an alicyclic, an aryl, an aralkyl, or a heterocyclic radical, and T is a divalent oxygen or sulfur atom, i. e., an alcohol, phenol, or thiol.

The alcohol or phenol reactants utilizable in preparing synthetic lubricants, in accordance with the present invention, are the monohydroxy aliphatic alcohols, alicyclic alcohols, phenols, aromatic alcohols, and heterocyclic alcohols. Heptanol-1, 2-ethylhexanol-1, octanol-1, octanol-2, decanol-1, cyclopentanol, cyclohexanol, 2-methylcyclohexanol, 3-methylcyclohexanol, phenol, 2-methylphenol, 3-methylphenol, 4-methylphenol, benzyl alcohol, α-naphthol, β-naphthol, α-tetralol, 2-hydroxy-5-methylthiophene, 2-hydroxypyridine, 3-hydroxypyridine, furfuryl alcohol, and 8-hydroxyquinoline may be mentioned by way of non-limiting examples. The preparation of these materials is set forth in the literature, and many of them are available in commercial quantities. While it will be apparent that the alcohol or phenol reactants should be pure in order to obtain products of reasonable purity, it is within the scope of the present invention to use technical grade alcohols and phenols, mixtures containing alcohols or phenols, or mixtures of two or more alcohols and/or phenols. It will be readily understood that products made from such mixtures or impure compounds will not be pure compounds. They will, however, be satisfactory synthetic lubricants having the aforementioned combination of desirable properties.

The thiol reactants utilizable herein include the alkanethiols and the cyclic thiols, i. e., cycloalkanethiols, aryl thiols, and heterocyclic thiols. Non-limiting examples of the thiol reactant are heptanethiol-1, octanethiol-1, 2-ethylhexanethiol-1, decanethiol-1, cyclopentanethiol, cyclohexanethiol, methylcyclohexanethiols, thiophenol, o-tolylthiol, m-tolylthiol, p-tolylthiol, benzylthiol, α-naphthylthiol, β-naphthylthiol, thienylthiol-2, thienylthiol-3, 2-ethylthienylthiol-3, and pyridylthiol-3. The thiols are prepared in many different ways, as is well known to those familiar with the art, and many are available in commerical quantities. While it will be apparent that the thiol reactant should be pure in order to obtain products of reasonable purity, it is within the scope of the present invention to use technical grade thiol reactants, mixtures containing thiol reactants, or mixtures of two or more thiol reactants. It will be readily understood that products made from such mixtures or impure reactants will not be pure compounds. They will, however, be satisfactory synthetic lubricants having the aforementioned combination of desirable properties.

The number of carbon atoms or heterocyclic atoms present in the alcohol, phenol, or thiol reactant is limited solely by the requirement, mentioned hereinbefore, that the sum of the number of carbon atoms and heterocyclic atoms in each molecule of the compound, having the formula $(RT)_3SiOSi(TR)_3$, must be between about 42 and about 60. Generally speaking, in order to obtain relatively pure compounds having the same number of atoms per radical, the alcohol, phenol, or thiol reactant, should contain at least seven carbon and heterocyclic atoms per molecule to achieve the required minimum sum of 42 in the product. It must be understood, however, that it is within the concept of the present invention to use a mixture of alcohol, phenol, or thiol reactants, as has been mentioned hereinbefore, so long as the minimum number of atoms in the product is achieved.

The alcohol, phenol, or thiol reactant, is reacted with the hexachlorodisiloxane reactant in a proportion of about six moles of said reactant for each mole of hexahalodisiloxane reactant, in accordance with the following equation:

$$Cl_3SiOSiCl_3 + 6RTH \rightarrow (RT)_3SiOSi(RT)_3 + 6HCl$$

In practice, however, it is preferable to use an excess of about one mole of the alcohol, phenol, or thiol reactant, i. e., a total of about seven moles. For practical reasons, it is preferable to carry out the reaction in a non-polar hydrocarbon solvent. Especially preferred for this purpose are the aromatic hydrocarbon solvents, such as, for example, benzene, toluene, and xylene. The amount of solvent to be used will vary between about 5 per cent and about 50 per cent, based on the total weight of the reactants.

The temperature of the reaction is not too critical a factor. In general, the temperature will be the reflux temperature of the solvent used, and preferably, it varies between about 80° C. and about 140° C. The time of the reaction will depend on the temperature employed. In practice, the reaction is complete after heating the reaction mixture, at the preferred temperatures, for a period of time varying between about two hours and about six hours, after all reactants have been added.

The alcohol, phenol, or thiol reactant, and particularly the thiol reactant, may be reacted with hexachlorodisiloxane reactant in the presence of a trialkylamine. The amine combines with the hydrogen chloride evolved during the reaction to form an insoluble amine hydrochloride. This is subsequently removed by conventional means of separation, such as filtration or decantation. Amines utilizable for this purpose are the trialkylamines having between about one and about three carbon atoms per alkyl radical. Non-limiting examples are triethylamine and tripropylamine. As indicated in the equation exemplifying the reaction herein involved, at least six moles of amine should be employed for each mole of hexachlorodisiloxane used in the reaction, and preferably, an excess of amine should be used.

The desired reaction product is isolated by distilling off, under reduced pressure, the excess alcohol, phenol, or thiol reactant, any unreacted hexachlorodisiloxane, and the non-polar hydrocarbon solvent. The desired synthetic lubricant product is recovered as the residue from the distillation operation.

The following specific examples are for the purpose of illustrating modes of preparing the compounds having the formula, $$(RT)_3SiOSi(TR)_3$$

contemplated in the present invention, and for the purpose of demonstrating the advantages thereof as synthetic lubricants. It is to be clearly understood, however, that the invention is not to be limited to the specific alcohol, phenol, or thiol reactants, or to the operations and manipulations described in the examples. As will be apparent to those skilled in the art, other reactants, as set forth hereinbefore, may be used to prepare a wide variety of products in accordance with this invention.

EXAMPLE 1

*Hexa(hexoxy) disiloxane*

To a solution of 28.5 grams of hexachlorodisiloxane in 80 grams of benzene, there were added dropwise 71 grams of hexanol-1. The reaction mixture was heated at reflux temperature (about 80° C.) until all evolution of hydrogen chloride had ceased (circa three hours). The resultant reaction mixture was topped at a pot temperature of 175° C. under a pressure of 5 millimeters to remove volatile materials, including benzene and unreacted reactants. The residue was filtered through filtering clay. There were thus obtained 62 grams of a clear mobile oil having the properties set forth in Table I.

EXAMPLE 2

*Hexa(octoxy) disiloxane*

To 28.5 grams of hexachlorodisiloxane dissolved in 80 grams of benzene, were added dropwise 91 grams of octanol-2. The reaction mixture was maintained at reflux temperature (about 80° C.) until all evolution of hydrogen chloride had ceased. The solvent and unreacted reactants were removed by topping the reaction mixture at 175° C. at 5 millimeters pressure. The residue was filtered through filtering clay to give 65 grams of a slightly viscous oil. The pertinent data for the reaction product thus obtained are set forth in Table I.

EXAMPLE 3

*Hexa(2-ethylhexoxy) disiloxane*

To 28.5 grams of hexachlorodisiloxane in 100 cubic centimeters of benzene were added dropwise 91 grams of 2-ethylhexanol-1. The reaction was carried out, and the product was isolated, in a manner similar to that employed in Example 1. The product thus obtained, weighing 80 grams, had the properties set forth in Table I.

EXAMPLE 4

*Hexa(decylthio) disiloxane*

To a solution of 14.3 grams of hexachlorodisiloxane and 58 grams of decanethiol-1 in 100 cubic centimeters of xylene, there was added, dropwise, a solution of 35 grams of triethylamine in 50 cubic centimeters of xylene. There was an immediate formation of a precipitate, accompanied by the evolution of heat. The reaction mixture was stirred and heated at reflux temperature (about 140° C.) for about four hours. The resulting mixture was cooled, filtered, and topped at about 250° C. at 15 millimeters pressure to remove volatile material. The residue was filtered through filtering clay. It consisted of 38.5 grams of a viscous, amber-colored liquid. The pertinent physical data for this product are set forth in Table I.

TABLE I

| Example | Pour Point, °F. | Kinematic Viscosity, Centistokes | | Viscosity Index |
|---|---|---|---|---|
| | | @ 100° F. | @ 210° F. | |
| 1 | <-65 | 6.62 | 2.45 | 200 |
| 2 | <-65 | 18.34 | 4.67 | 184 |
| 3 | <-65 | 13.37 | 4.17 | 224 |
| 4 | +5 | 40.0 | 7.84 | 150 |

From the data set forth in Table I, it will be apparent that the products having the formula, $(RT)_3SiOSi(TR)_3$, in which the total number of carbon atoms and heterocyclic atoms is at least 42, are excellent synthetic lubricants having high viscosity indices and low pour points. The criticality of the minimum number of carbon and heterocyclic atoms is demonstrated by the data for Example 1, having 36 carbon atoms per molecule, wherein the product has a low viscosity which renders it unsuitable for use as a lubricant.

The stability of synthetic lubricants of this type is illustrated by the data in Table II, obtained by comparing a sample of the product of Example 2 with an S. A. E. 10 motor oil in a laboratory bench-scale oxidation test. The motor oil used for comparative purposes is an oil obtained from a paraffinic crude and has a kinematic viscosity of 40.5 cs. at 100° F. and 5.99 cs. at 210° F., a viscosity index of 100, a pour point of +5° F., and a neutralization number of 0.05.

TABLE II

| Sample | N. N.[1] | Tube Sludge | Lead Loss, mg. | Appearance of Copper |
|---|---|---|---|---|
| Example 2 | 2.1 | None | 0.5 | Brown. |
| SAE 10 Oil | 15.0 | ...do... | 235 | Brassy. |

[1] Neutralization Number=mg. KOH required to neutralize 1 gram of oil sample.

In the test from which the data set forth in Table II were obtained, a 50-milliliter sample of test oil was placed in a test tube containing an oxidation catalyst comprising 15.6 square inches of iron, 0.87 square inch of aluminum, and 0.78 square inch of copper, and lead piece having a surface area of 0.16 square inch. The tube was placed in a constant temperature bath at about 300° F. A gas delivery tube was inserted into the oil and dry air was passed through the oil at a rate of five liters per hour. After 40 hours, the tube was removed and examined for sludge. The sludging of the oil forms a criterion of the tendency of the lubricant to form insoluble substances, organic and inorganic. The lead piece, which had been carefully weighed prior to the test, was removed and carefully weighed. The loss in weight indicates the tendency of the lubricant to attack lead-containing bearing surfaces. The neutralization number is a measure of the susceptibility of the lubricant to oxidize to acidic substances.

From the data set forth in Table II, it will be apparent that the synthetic lubricants of the present invention are superior to mineral lubricating oils. They are not susceptible to oxidation and, finally, there is very little attack on lead bearing surfaces.

In addition to their utility as synthetic lubricants, the products of the present invention are useful as heat transfer media, hydraulic fluids, and the like. They are, in general, completely soluble in mineral lubricating oils and, accordingly, they can be used as extenders for lubricants, or as additives to lubricating oils for the purpose of imparting desirable properties thereto.

Although the present invention has been described with preferred embodiments, it is to be understood that modifications and variations may be resorted to without departing from the spirit and scope of this invention, as those skilled in the art will readily understand. Such variations and modifications are considered to be withing the purview and scope of the appended claims.

What is claimed is:

1. A compound having the formula, $$(RT)_3SiOSi(TR)_3$$

wherein R is a radical selected from the group consisting of alkyl, cycloalkyl, aryl, aralkyl, and thienyl, 2-ethylthienyl, 5-methyl-thienyl, pyridyl, furfuryl, and quinolyl radicals, and T is a divalent atom selected from the group consisting of oxygen and sulfur atoms, in which the total number of carbon atoms and heterocyclic atoms in each molecule varies between about 42 atoms and about 60 atoms.

2. Hexa(octoxy)disiloxane.
3. Hexa(2-ethylhexoxy)disiloxane.
4. Hexa(decylthio)disiloxane.

BERNARD A. ORKIN.

REFERENCES CITED

The following references are of record in the file of this patent:

UNITED STATES PATENTS

| Number | Name | Date |
|---|---|---|
| 1,918,338 | Kaufmann | July 18, 1933 |
| 2,416,531 | Morril | Feb. 25, 1947 |
| 2,490,691 | Langkammerer | Dec. 6, 1949 |

OTHER REFERENCES

Schumb, Jour. Am. Chem. Soc., vol. 63 (1941), pp., 2853-4.

Schumb, Jour. Am. Chem. Soc., vol. 63 (1941), pp., 2753-5.

Backer and Steinstra (1), "Recuil de Trav. Chim.," vol. 54 (1935), pp. 42 and 43.

Backer and Klaessens (2), "Recuil de Trav. Chim.," vol. 61 (1942), p. 504.